(12) United States Patent
Hsu et al.

(10) Patent No.: US 7,945,662 B2
(45) Date of Patent: *May 17, 2011

(54) INTERNET DOMAIN KEYWORD OPTIMIZATION

(75) Inventors: Frederick Weider Hsu, Los Angeles, CA (US); Lawrence Chun Ng, Los Angeles, CA (US)

(73) Assignee: Oversee.Net, Los Angeles, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 11/868,893

(22) Filed: Oct. 8, 2007

(65) Prior Publication Data

US 2008/0027812 A1 Jan. 31, 2008

Related U.S. Application Data

(63) Continuation of application No. 10/917,866, filed on Aug. 13, 2004, now Pat. No. 7,281,042.

(60) Provisional application No. 60/495,635, filed on Aug. 15, 2003.

(51) Int. Cl.
*G06F 15/173* (2006.01)
*G06F 15/16* (2006.01)

(52) U.S. Cl. ......... 709/224; 709/218; 709/217; 709/203

(58) Field of Classification Search .................. 709/217, 709/219, 224, 203, 218
See application file for complete search history.

(56) References Cited

U.S. PATENT DOCUMENTS

| | | | |
|---|---|---|---|
| 5,712,979 A | 1/1998 | Graber et al. | |
| 5,996,007 A | 11/1999 | Klug et al. | |
| 6,009,459 A * | 12/1999 | Belfiore et al. | 709/203 |
| 6,321,228 B1 | 11/2001 | Crandall et al. | |
| 6,381,592 B1 | 4/2002 | Reuning | |
| 6,393,407 B1 | 5/2002 | Middleton, III et al. | |
| 6,453,312 B1 | 9/2002 | Goiffon et al. | |
| 6,615,247 B1 * | 9/2003 | Murphy | 709/217 |
| 6,654,735 B1 | 11/2003 | Eichstaedt et al. | |
| 6,665,656 B1 | 12/2003 | Carter | |
| 6,691,106 B1 | 2/2004 | Sathyanarayan | |
| 6,708,215 B1 | 3/2004 | Hingorani et al. | |
| 6,732,086 B2 * | 5/2004 | Plow et al. | 707/3 |
| 6,734,886 B1 | 5/2004 | Hagan et al. | |
| 6,763,496 B1 | 7/2004 | Hennings et al. | |
| 6,785,671 B1 * | 8/2004 | Bailey et al. | 707/3 |
| 6,804,701 B2 | 10/2004 | Muret et al. | |
| 6,842,782 B1 | 1/2005 | Malik et al. | |
| 6,853,982 B2 * | 2/2005 | Smith et al. | 705/27 |
| 6,877,007 B1 | 4/2005 | Hentzel et al. | |

(Continued)

*Primary Examiner* — Kristie D Shingles
(74) *Attorney, Agent, or Firm* — Connolly Bove Lodge & Hutz LLP; Jonathan A. Jaech

(57) ABSTRACT

A computerized system and method for optimizing contents of a domain landing page for increased revenues for the domain name owner. A landing server tracks user interactions with the domain landing page and generates an optimized keyword data set for the domain name. The keyword data set is used for selecting the information to be displayed on the domain name page. According to one embodiment, the keywords are associated with advertiser payment values. When a link to an advertiser bidding on a particular keyword is selected, revenue generated due to the click is shared with the domain name owner. Selection of links on pop-under pages displayed with a landing page are also shared with the domain name owner. Semantic analysis of keywords and domain names allows the generation of a related keyword data set when there is insufficient number of relevant user interactions for generating the optimized keyword data set.

28 Claims, 12 Drawing Sheets

U.S. PATENT DOCUMENTS

| | | |
|---|---|---|
| 6,895,437 B1 | 5/2005 | Cowdrey et al. |
| 6,910,071 B2 | 6/2005 | Quintero et al. |
| 6,912,525 B1 | 6/2005 | Chipalkatti et al. |
| 6,954,755 B2 | 10/2005 | Reisman |
| 6,959,319 B1 | 10/2005 | Huang et al. |
| 7,000,242 B1 | 2/2006 | Haber |
| 7,062,488 B1 * | 6/2006 | Reisman ............................ 707/8 |
| 7,092,901 B2 * | 8/2006 | Davis et al. ..................... 705/26 |
| 7,146,416 B1 * | 12/2006 | Yoo et al. ...................... 709/224 |
| 2002/0087679 A1 | 7/2002 | Pulley et al. |
| 2002/0188694 A1 | 12/2002 | Yu |
| 2002/0198979 A1 * | 12/2002 | Yu ................................. 709/224 |
| 2003/0208578 A1 | 11/2003 | Taraborelli et al. |
| 2004/0068436 A1 * | 4/2004 | Boubek et al. .................. 705/14 |
| 2004/0068460 A1 * | 4/2004 | Feeley et al. .................... 705/37 |
| 2004/0098380 A1 | 5/2004 | Dentel et al. |
| 2004/0215715 A1 | 10/2004 | Ehrich et al. |

* cited by examiner motorcycles          Find Info!
                        124

Your search for motorcycles returned the following results:

Sponsored Information

Motorcyles For Sale — 122
Low Priced Motorcycles. Huge Selection at eBay!
ebay.come MotorcycleUSA Superstore
Sportbike, Cruiser, Dirtbike, ATV Gear, Apparel, Parts, Accessories
www.motorcycle-superstore.com

Featured Information

Texelent
Manufacturer produces GPS mounts for Honda motorcyles. Other products include
Motorcycle luggage trailers, motorcycle accessories, and motorcycle apparel.
www.texelent.com Excaliber Polishing and Plating
Offers chrome and polishing for motorcycles, car parts, and housewares.
www.excaliberpolishing.com Motorcycle Batteries USA
Sells high-performance sealed AGM batteries for motorcyles, ATV, PWC, and scooters.
www.motorcyclebatteriesusa.com

FIG. 6

INTERNET DOMAIN KEYWORD OPTIMIZATION

CROSS-REFERENCE TO RELATED APPLICATION(S)

This application is a continuation of Ser. No. 10/917,866 filed on Aug. 13, 2004 now U.S. Pat. No. 7,281,042. This application claims the benefit of U.S. provisional application No. 60/495,635 filed on Aug. 15, 2003, the content of which is incorporated herein by reference.

BACKGROUND OF THE INVENTION

There are currently domain parking services which offer owners of domain names a domain parking page that may be displayed while a custom website is in development. The domain parking page may be a simple, generic page with a message indicating that the website is in development. During this development period, a person accessing the domain name is presented with the domain parking page instead of a dead page which would cause the display of an error message. The display of the domain parking page thus allows the person accessing the domain name to anticipate the creation of a custom website, and even create a "buzz" of the up-and-coming site.

Domain parking pages may also provide additional information and advertisements in addition to any generic message about an up-and-coming site. The information and advertisements displayed on the parking page, however, may be irrelevant and of no interest to the accessing person. There is, however, a desire to display information and advertisements that are relevant to a person accessing the parking page because the more relevant the information and advertisements, the more likely the user will interact with the displayed information. In the world of web-advertising, user interactions translate directly to revenues.

SUMMARY OF THE INVENTION

The present invention is directed to a computerized system and method for optimizing contents of a domain name page. The optimization aids in displaying information on the domain name page that is relevant to a person accessing the domain name, and translates into increased revenues for the domain name owner.

According to one embodiment of the invention, an end device transmits a first request associated with a domain name to a first server associated with the domain name. The first server receives the first request, and in response, generates a second request associated with the domain name. A second server receives the second request and in response, transmits a domain name page to the end device for display thereon.

According to one embodiment of the invention, the domain name page is optimized based on historic user data. In this regard, the second server is configured to track user interactions with the domain name page and identify a keyword associated with a tracked user interaction. The server determines a level of relevancy of the keyword for a user accessing the domain name page based on the tracked user interaction. A keyword data set including the keyword is then generated based on the determined level of relevancy. The keyword data set is used for selecting the information to be displayed on the domain name page.

The user interaction may be a keyword search request or a selection of a keyword search result.

According to one embodiment of the invention, the keyword may be associated with an advertiser payment value. According to this embodiment, the second server retrieves the advertisement payment value associated with the keyword, calculates a revenue based on the payment value, retrieves account information for an owner of the domain name, and credits the account based on the calculated revenue.

According to another embodiment of the invention, the second server engages in semantic analysis for displaying keywords and associated information that are related to the entered domain name or a particular keyword entered or selected by a person accessing the domain name page. In generating the related keyword list, the second server analyzes a second keyword associated with the domain name page, identifies a third keyword associated with the second keyword, selects second information for display on the domain name page based on the third keyword, and inserts the selected second information on the domain name page.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 6 is an exemplary screenshot of a search results page according to one embodiment of the invention;

DETAILED DESCRIPTION

According to one embodiment of the invention, a domain optimization mechanism uses historical user behavior data to, optimize domain name parking pages to present information that is aimed to be relevant to people accessing the associated domain names. The optimization mechanism further uses advertising value information to present relevant information that is aimed to optimize revenues for the domain name owner. A partnership program between the domain name owner and the parking service provider allows the domain name owner to get a share of revenues earned by the parking service from the traffic to his or her domain. The domain name owners are also provided with detailed, granular statistics and an administrative interface that allows the domain name owners to effectively organize and track visitor and revenue statistics.

Figure 1:
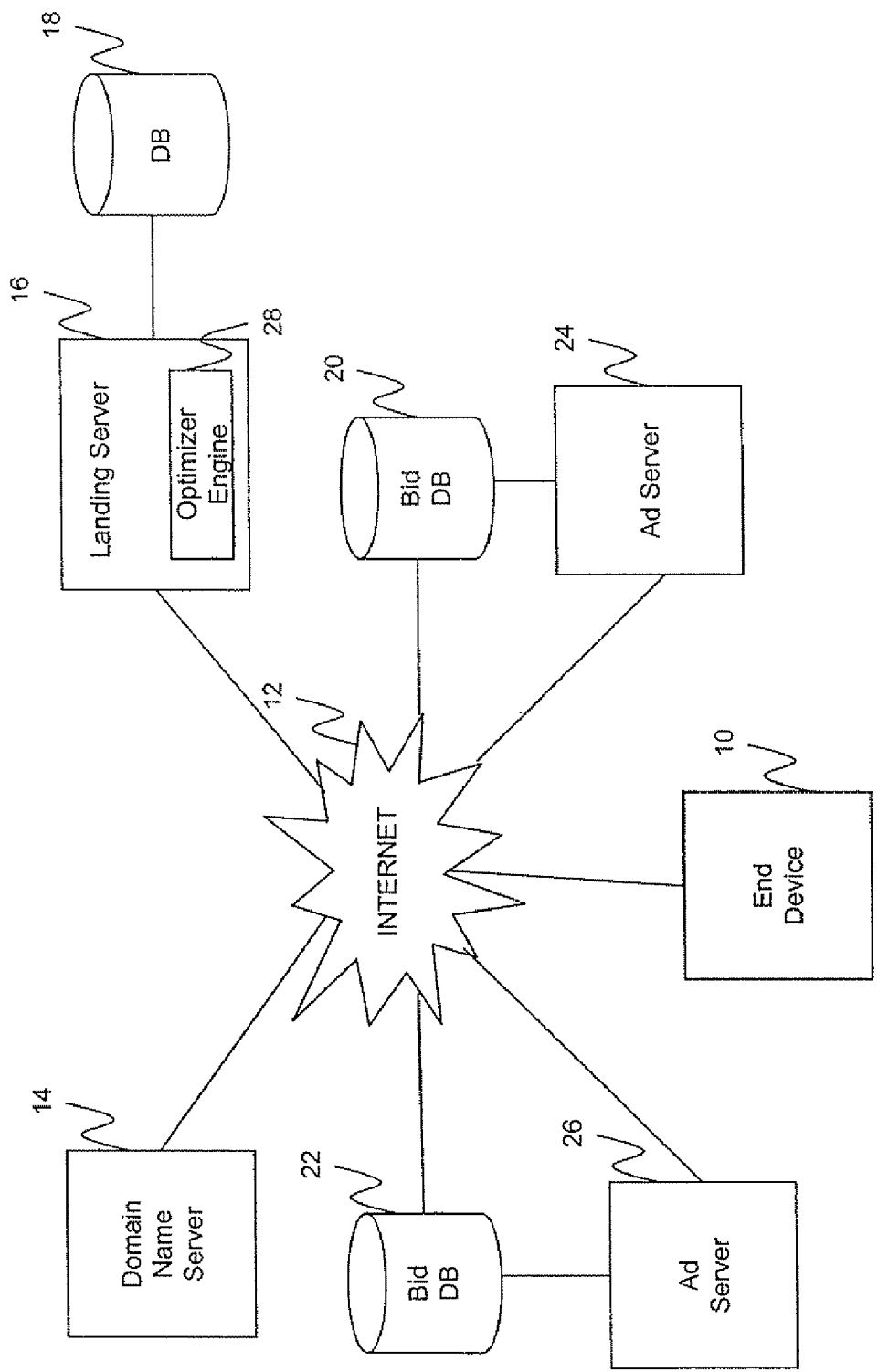
FIG. 1 is a schematic block diagram of a domain optimization system according to one embodiment of the invention.

FIG. 1 is a schematic block diagram of a domain optimization system according to one embodiment of the invention. The system includes an end device 10 connected to a world wide web (the web) over a public wide area network such as, for example, the Internet 12. According to one embodiment of the invention, the end device 10 is a personal computer equipped with an Internet connection and a processor configured with a browser software for retrieving and viewing information obtained 25, from the web. The end user device may also take the form of other wired or wireless devices, such as, for example, a mobile telephone, personal data assistant (PDA), television connected to a set-top-box, and the like.

The end device 10 includes an input for receiving user commands and an output for providing audio-visual information retrieved from the web to the user. The input may be a keyboard, keypad, joystick, remote controller, and/or voice or touch-activated input device conventional in the art. The output may include one or more speakers and/or a VGA, SVGA liquid-crystal-display (LCD) screen, an LED display screen, or any other suitable display apparatus conventional in the art.

Also connected to the web is a domain server 14 and a landing server 16. Although in the present embodiment the domain server 14 and landing server 16 are depicted as two physically separate servers, a person of skill in the art should recognize that the functionality of the domain server may be incorporated into the landing server 16, and vice versa.

The domain server 14 may be mapped to one or more domain names associated with one or more domains, and is configured with hardware and software conventional in the art to process universal resource locator (URL) requests transmitted by the end device 10. According to one embodiment of the invention, receipt of a URL with a particular domain name causes the domain server 14 to redirect requests associated with the domain name to the landing server 16.

The landing server 16 is configured with hardware and software conventional in the art to process traffic redirected by the domain server 14. The landing server 16 may be operated, for example, by a provider of a domain parking service.

The landing server 16, in response to the receipt and processing of a particular URL request including a domain name, displays a web page that is associated with the domain name included in the URL request. The initial web page that is displayed may be referred to as a domain parking page or landing page. According to one embodiment of the invention, an optimization mechanism implemented by an optimizer engine 28 maintained by the landing server 16 determines the content and layout of the domain landing page so as to increase user interactions and generate a maximum revenue for the domain name owner. In this regard, the domain landing page provides information links that are likely to be of interest to, and therefore likely to be selected by, users accessing the domain name. The optimizer engine 28 may be implemented via one or more processors executing computer program instructions stored in a local memory (not shown).

The landing server 16 is coupled to a mass storage device ("DB") 18 that stores information for generating the domain landing pages to be transmitted to the end devices 10. Such information includes, for each domain name, for example, a generic keyword set, related keyword set, and/or optimized keyword set. According to one embodiment of the invention, the domain landing pages are generated using a web publishing language such as, for example, a HyperText Mark-up Language (HTML).

The mass storage device further stores user interaction information for each domain, and other information and data objects for generating the related and optimized keyword sets, and for performing other optimizations of the domain. The mass storage device 18 may also store user records for the owners of the domain names registered with the landing server. Each user record may include, for example, user registration and account information. The mass storage device 18 may further store advertiser records including advertiser registration and account information for advertisers advertising on the landing pages provided by the landing server 16.

The landing server 16 is coupled to one or more bid databases 20, 22 hosted by advertisers and other entities advertising on the domain landing pages, or on associated pop-up or pop-under pages provided by the landing server 16. Each bid database includes a list of keywords that are to cause a display of information about the advertiser. Each keyword further includes a bid price, also referred to as a payment value, that the advertiser is willing to pay to an entity causing the display of the advertiser information stored in an ad server 24 or 26. For example, a sporting goods company is likely to pay a high bid price for the keyword "basketball," but not likely to pay any kind of a bid price for the keyword "lingerie." Victoria's Secret™, on the other hand, may find the keyword "lingerie" very valuable, and is likely to pay a high bid price for this keyword to allow their advertisement to appear when the keyword is entered or selected by a visitor to the domain name.

According to one embodiment of the invention, the landing server 16 downloads into a local keyword bid database maintained in the mass storage device 18, the keyword bid information stored in a particular bid database 20 or 22 responsive to a particular user action, such as, for example, selection of an advertiser's link on the landing page. According to another embodiment of the invention, the keyword bid information stored in the bid databases 20, 22 are automatically downloaded to the local keyword bid database on a periodic basis. The local keyword bid database may then also be updated on a periodic basis.

Figure 2:
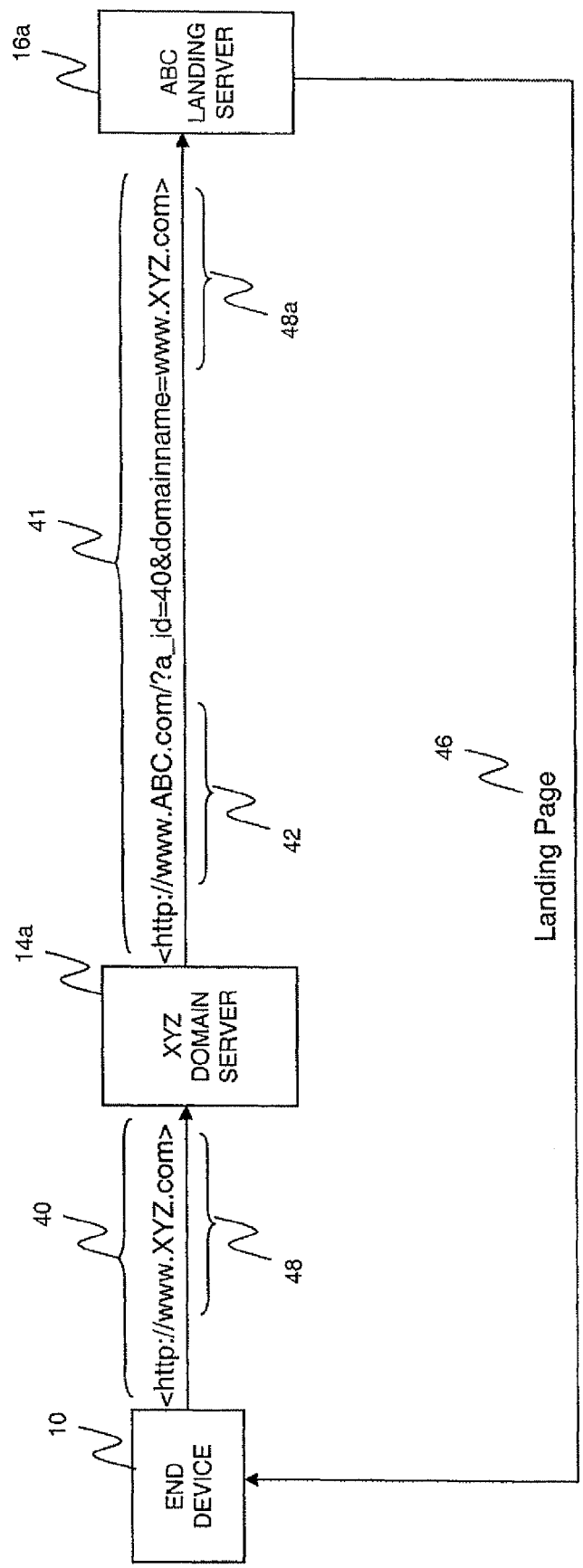
FIG. 2 is a functional block diagram illustrating a redirection of URL requests according to one exemplary embodiment of the invention.

FIG. 2 is a functional block diagram illustrating the redirection of URL requests according to one exemplary embodiment of the invention. In general terms, a user invokes the browser software configured at the end device 10 to transmit a URL request 40 that includes a particular domain name 48. In the illustrated example, the URL request attempts to retrieve a web page located at Internet site "XYZ.com".

The URL request 40 is routed over the Internet 12 according to conventional mechanisms, to a domain server 30 associated with the domain name 48. Accordingly, in the illustrated example, the URL request 40 for the domain name "www.XYZ.com" is directed to the XYZ domain server 14a.

According to one embodiment of the invention, the XYZ domain server 14a is programmed to redirect all requests for the domain name 48 to an ABC landing server 16a. This may be done in any manner conventional in the art, as long as the domain name 48 included in the original URL request 40 is embedded in a redirection URL 41 to the landing server 16. For example, XYZ domain server 14a may be configured with a redirect service that allows the domain name owner to simply 10 input the redirection URL, and the service automatically redirects all requests for the domain name 48 to the ABC landing server 16a. The domain name owner may also choose to manually create a static redirection script using a web scripting language such as, for example, Perl/CGI, and upload the script into a main index file for the domain. The domain name owner may further generate a redirection code using straight HTML. Regardless of the redirection mechanism that is employed, what is desired is that the domain name 48 indicated in the original URL request 40 be inserted into the redirection URL 41.

According to one embodiment of the invention, a redirection URL may not be necessary if the end-device 10 transmits the URL request directly to the landing server 16.

In the illustrated example, the XYZ domain server 14a for the domain name "www.XYZ.com" redirects the request for the domain name to the ABC landing server 16a via the redirection URL 41. The redirection URL 41 includes a landing server domain name 42, which, in this example, is "www.ABC.com." The redirection URL 41 further includes an embedded domain name 48a. The embedded domain name 48a may be a fully-qualified domain name, a second-level domain name, or some other identifier sufficient to identify the domain name owner.

Upon receipt of the redirection URL 41 by the ABC landing server 16a, the landing server retrieves from the mass storage device 18 a domain landing page 46, also referred to as a parking page in some circumstances. The retrieved landing page 46 is then transmitted to the end device 10 for display on the display apparatus coupled to the end device.

According to one embodiment of the invention, the domain landing page 46 is composed of one or more type-in search fields and keyword hyperlinks. Entry or selection of a particular keyword causes the landing server 16a to retrieve and display information associated with the keyword. As visitors to the domain name 48 interact with the domain landing page over time, the landing server 16a monitors the interaction information and uses such information for optimizing the domain. The optimization relates to the type of content, and the placement of such content, on the domain landing page. According to one embodiment of the invention, the content includes a set of keyword links chosen to be displayed on the domain landing page in such as manner so as to generate a maximum revenue for the owner of the domain name. For example, certain keyword links may or may not be displayed on the landing page based on previous user interactions with the domain that predict their interest on the keyword. Although keywords are used as an example of content that is desired to be optimized for a particular domain, a person of skill in the art should recognize that other types of content may also be optimized, such as, for example, display ads, display banners, contents in pop-up and pop-under pages, and the like.

Figure 3:
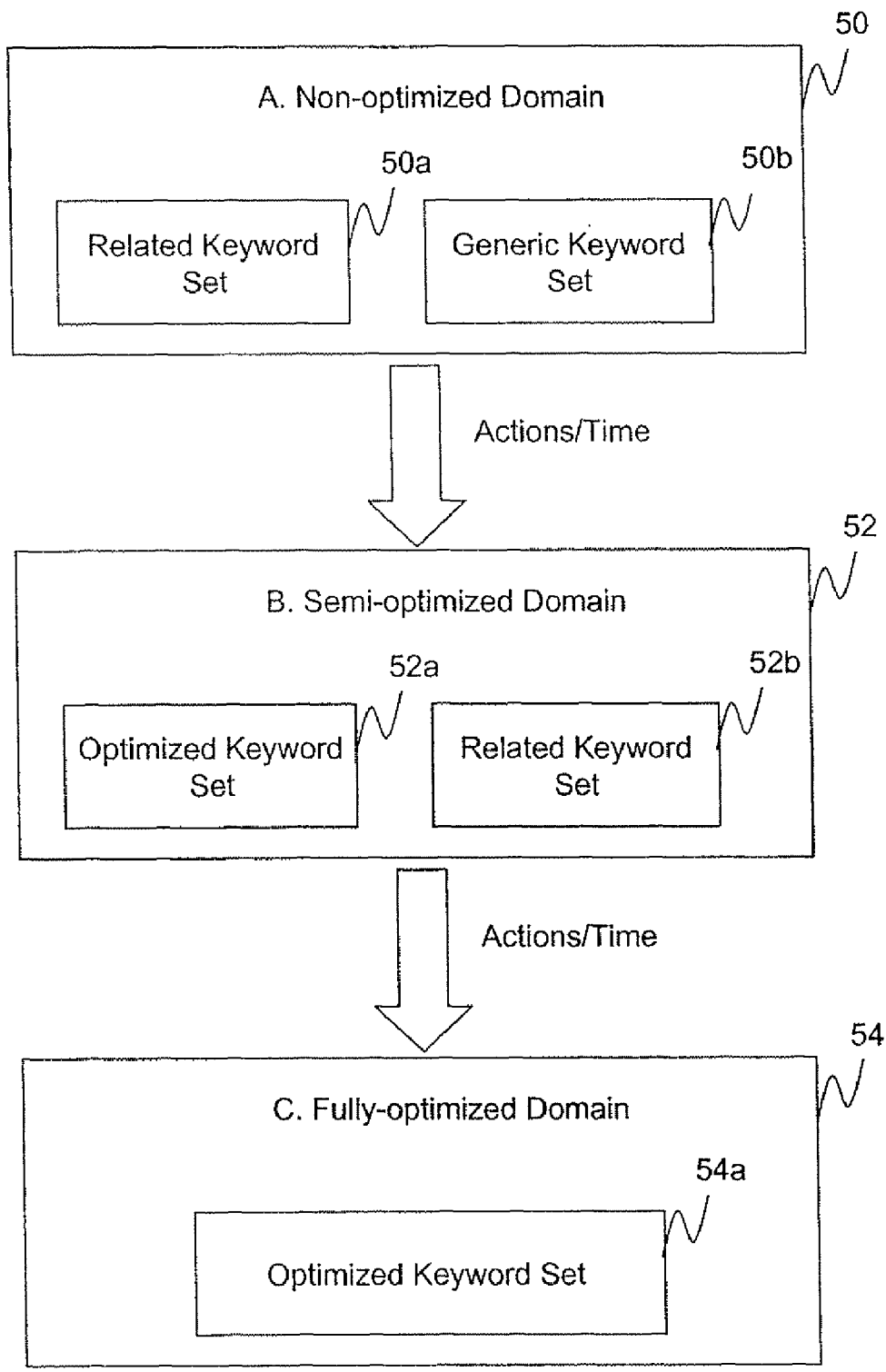
FIG. 3 is a schematic block diagram illustrating a progression of a domain towards optimization according to one embodiment of the invention.

FIG. 3 is a schematic block diagram illustrating a progression of a domain towards optimization according to one embodiment of the invention. A domain starts-off as a non-optimized domain 50, progresses towards a semi-optimized domain 52 as some relevant user-action information is collected, and when enough relevant user-action information has been collected, ends as a fully-optimized domain 54.

According to one embodiment of the invention, the non-optimized domain 50 contains no historic optimized keywords. As such, the non-optimized domain 50 relies on a related keyword set 50a and a generic keyword set 50b for its content. The related keyword set 50a includes a set of keywords based on an analysis of the domain name and/or user actions. Such related keywords are aimed to present as much relevant information as possible on the domain landing page to encourage user action. The generic keyword set 50b includes untargeted keywords that are aimed to cover a broad spectrum of interest areas. The related keyword set 50a is used as the main content for the domain landing page, and the generic keyword set 50b used as the domain's secondary, of backfill keyword set.

According to one embodiment of the invention, the semi-optimized domain 52 includes various historically optimized keywords, such as, for example, one to ten optimized keywords. As such, the semi-optimized domain includes an optimized keyword set 52a constituting a primary source of content for the domain landing page. The semi-optimized domain also includes a related keyword set 52b used as the domain's secondary content.

The fully-optimized domain 54 includes an optimized keyword set 54a which, according to one embodiment of the invention, is used as the only source of content for the domain landing page. The fully-optimized domain 54 includes a set of keywords determined to be most relevant to a user accessing the domain based on historic user interaction data. According to one embodiment of the invention, the keywords in the generic, related, and optimized keyword sets are obtained from the local keyword bid database maintained in the mass storage device 18, which, according to one embodiment of the invention, stores keywords and associated bid prices based on historic user interactions.

According to one embodiment of the invention, the non-optimized, semi-optimized, and fully-optimized domains each include a type-in search field for receiving user input search queries, also referred to as seed data. The seed data is used to build historic user interaction data for the domain, as well as to offer users the flexibility to enter the keywords that they may desire without being constrained to the generic, related, or optimized keywords preselected for the domain.

Figure 4:
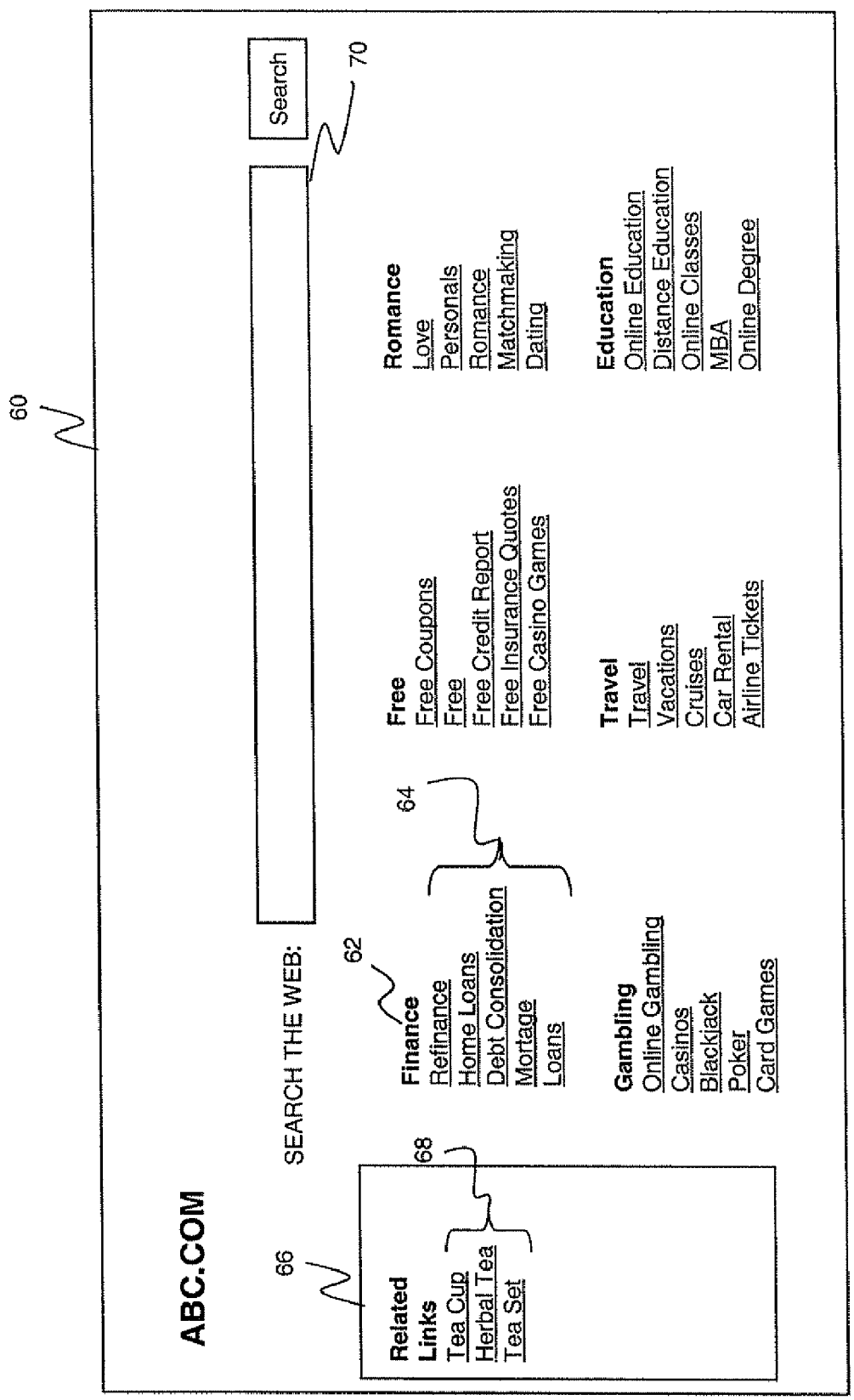
FIG. 4 is an exemplary screenshot of a non-optimized domain landing page according to one embodiment of the invention.

FIG. 4 is an exemplary screenshot of a non-optimized domain landing page 60, also referred to as a default landing page, according to one embodiment of the invention. The default landing page includes the generic keyword set 50b displayed as generic keyword links 64 in one or more generic categories 62. The related keyword set 50a is displayed as one or more related keyword links 68 in a related links section 66. According to one embodiment of the invention, selection of a particular keyword link 64, 68 causes the retrieval of information and/or advertisement links (collectively referred to as ad links) that are associated with the selected keyword. The keywords may also be typed-in by the user into a search field 70. The retrieved ad links are then displayed as search result listings in a separate results page.

Figure 5:
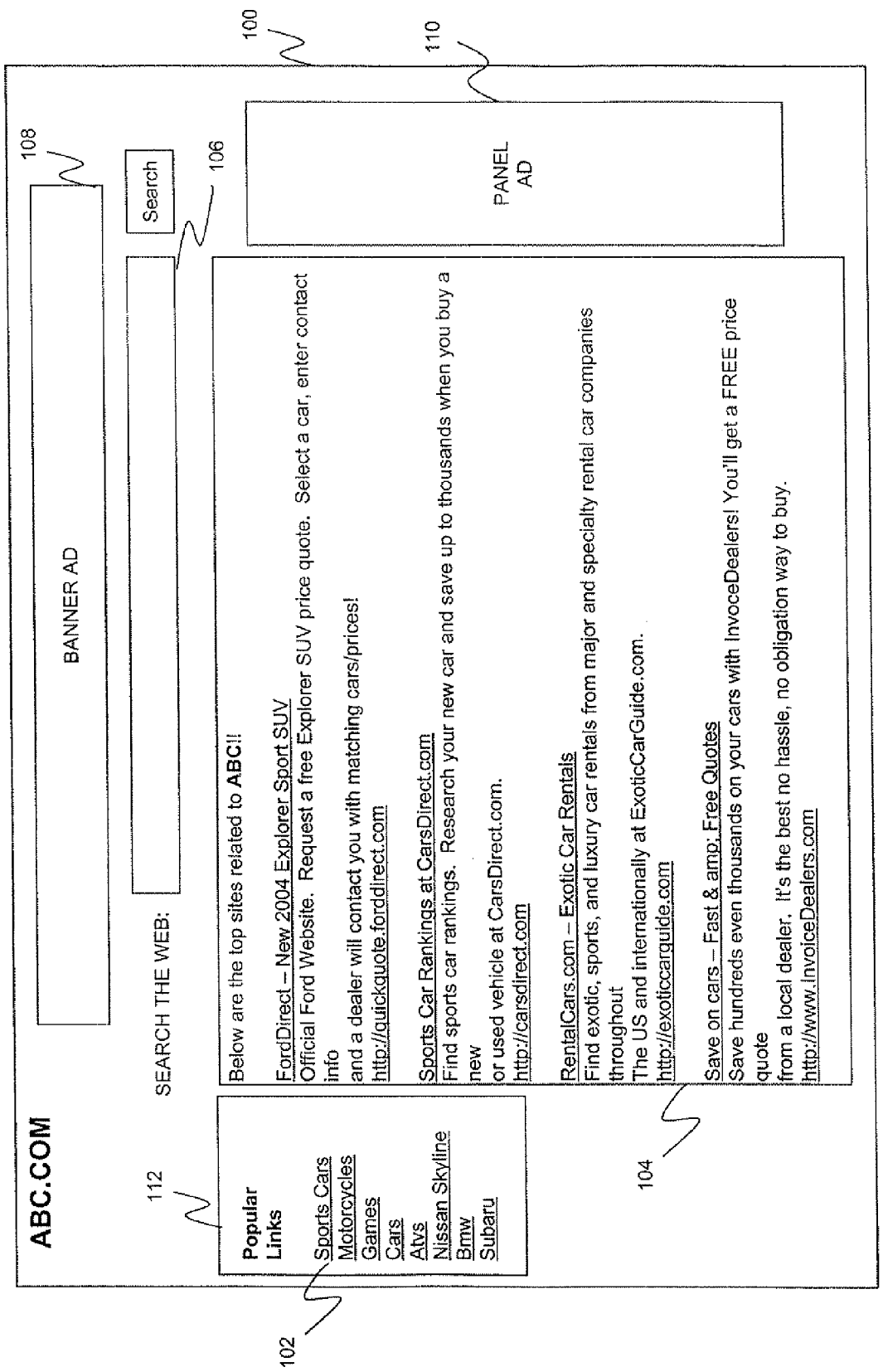
FIG. 5 is an exemplary screenshot of a fully-optimized landing page according to one embodiment of the invention.

FIG. 5 is an exemplary screenshot of a fully-optimized landing page 100 according to one embodiment of the invention. According to the illustrated embodiment, the optimized landing page 100 displays the optimized keyword set 54a as one or more optimized keyword links 102 in a popular links section 112. Selection of a particular keyword link 102 causes a display of associated ad links in the separate results page.

According to one embodiment of the invention, the results page includes ad links displayed as search result listings for a particular search request. Some of the ad links may also be displayed on a direct links section 104 of the optimized landing page 100. The direct links section 104 is preferably set to be a location of the landing page that is determined to be a statistically high-traffic section. In the illustrated embodiment, ad links associated with the first keyword, "sports cars,"

are displayed in the direct links section 104. Selection of a particular ad link causes the end-user device 10 to be directed to an associated ad server 24, 26 for display of an associated web page.

In addition to the above, the fully optimized landing page 100 includes a type-in search field 106 and may optionally include one or more ad banners 108 and/or panels 110. The search field 106 allows a user to conduct a search of specific keywords that are typed-in by the user. Ad links associated with the searched keywords are then displayed in the separate results page.

The ad banners 108 and panels 110 may display targeted advertisements that have been optimized based on the domain name. The ad banners 108 and panels 110 may be rotated on a periodic basis. For example, different ads may be displayed each time the end-user device 10 accesses the particular domain.

According to one embodiment of the invention, a semi-optimized landing page (not shown) has a format similar to the fully-optimized landing page of FIG. 5. However, for a semi-optimized landing page, the popular links section 112 displays both optimized keywords for the optimized keyword set 52a as well as related keywords for the related keyword set 52b.

FIG. 6 is an exemplary screenshot of a search results page 120 displaying search result listings for a selected keyword link, such as, for example, a generic keyword link 64, a related keyword link 68, or an optimized keyword link 102, or a keyword typed into a search field of the domain landing page, such as, for example, into search field 70 or 106. The search result listings may take the form of one or more ad links 122 associated with a selected or entered keyword. Selection of a particular ad link 122 causes the end-user device to access an associated ad server 24, 26 and display an associated web page.

The results page 120 also includes a type-in search field 124 that allows the user to conduct further searches from the results page. The search field may display, by default, the keyword that caused the display of the particular results page.

According to one embodiment of the invention, in addition to optimizing the content of the landing pages, the format and layout of the landing pages are also optimized for maximizing the revenue to the domain name owners. In this regard, the optimizer engine 28 may track and compare user interactions for different formats and layouts. For example, the optimizer engine 28 may track a total number of user interactions with the search field 106 when the search field is displayed at the bottom of the landing page, compare it to a total number of user interactions when the search field is placed at the top of the landing page, and determine the layout position which generates most use of the search field. The layout positions and formats are, therefore, dynamic, changing based on user historic data.

According to one embodiment of the invention, upon retrieval of an initial, parent landing page, the landing server 16 spawns one or more child webpages for concurrent display with the parent landing page. A child webpage may also be spawned upon a user command to exit the domain landing page.

The spawned webpage may be a pop-under page that is displayed beneath the parent landing page. The spawned webpage may also be a popup page that is displayed above the parent webpage. According to one embodiment of the invention, if a child webpage is spawned upon an initial access of the domain for concurrent display with the parent landing page, the child webpage takes the form of a pop-under page. However, if the child webpage is spawned in response to a user command to exit the parent landing page, the child webpage takes the form of a popup page.

In either scenario the child webpage displays a link associated with an advertiser, which may or may not be related to the parent domain name or content on the parent landing page. According to one embodiment of the invention, the revenue that is generated to an operator of the landing server 16 due to the display of an advertisement or some other advertiser information resulting from a user selection of the link on the child webpage, is also shared with the domain name owner.

A domain landing page progresses from a default state, to a semi-optimized state, to a fully optimized state based on relevant user interactions with the domain. According to one embodiment of the invention, the optimizer engine 28 includes software and/or hardware for tracking the relevant user interactions with the associated landing page and generating the optimized keyword set 52a, 54a to be included in the landing page. The relevant user interactions tracked by the optimizer engine 28 include but are not limited to the entry of search keywords on the type-in search fields 70, 106, 124, selection of keyword links 64, 68, 102, selection of ad links 122, and the selection of ad banners 108 and panels 110 associated with the domain page. The tracking of such user interactions may be done according to mechanisms conventional in the art.

Figure 7:
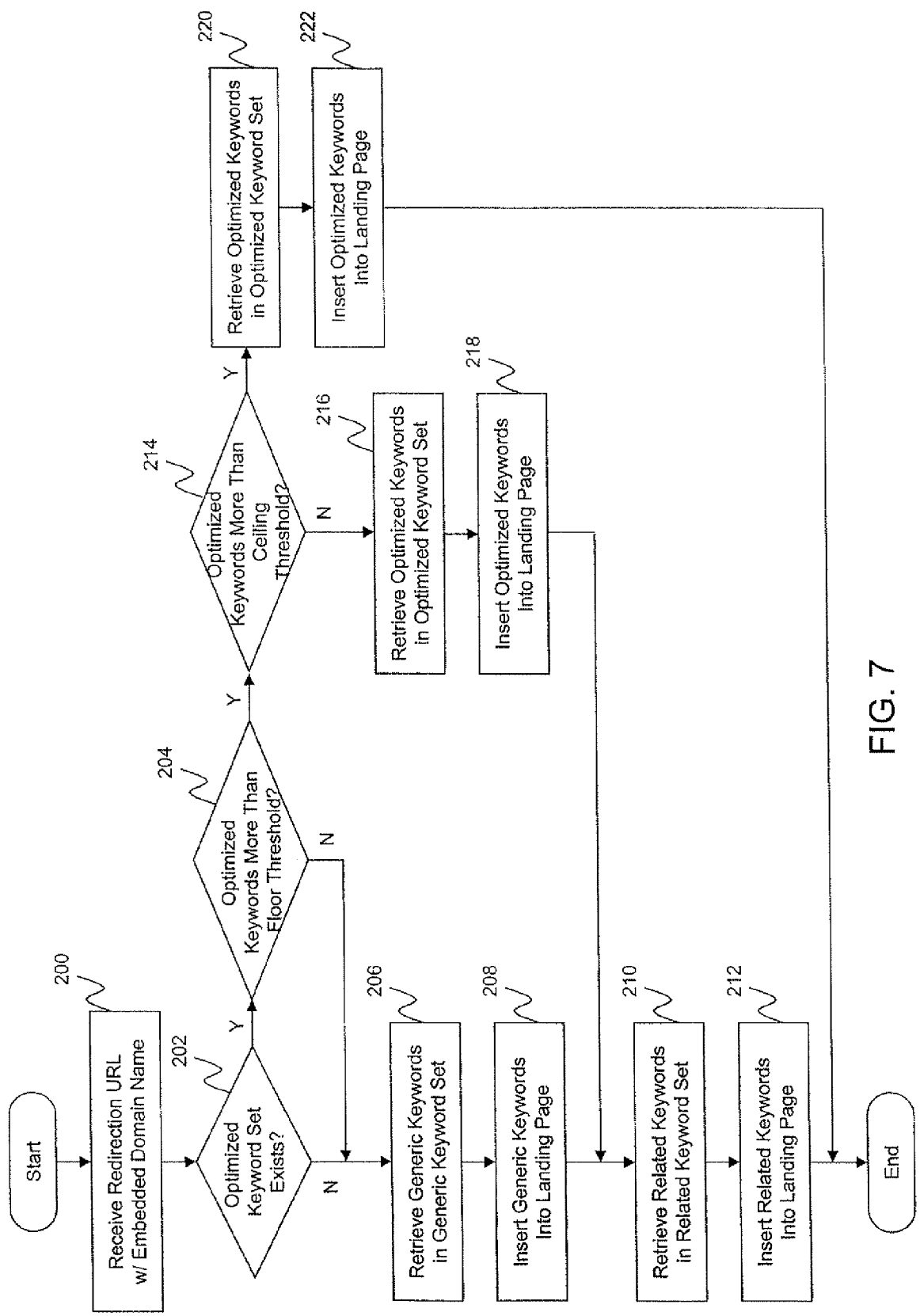
FIG. 7 is flow diagram of a process implemented by an optimizer engine for generating an appropriate domain landing page according to one embodiment of the invention.

FIG. 7 is flow diagram of a process implemented by the optimizer engine 28 for generating an appropriate domain landing page according to one embodiment of the invention. In step 200, the landing server 16 receives a redirection URL, such as, for example, redirection URL 41, with an embedded domain name 48a. In step 202, the optimizer engine determines whether an optimized keyword set exists for the domain name. If an optimized keyword set does not exist for the domain name, or an optimized keyword set exists, but the number of keywords contained in the set is below a floor threshold as is determined in step 204, the optimizer engine 28 determines that the domain is a non-optimized domain. In this scenario, the optimizer engine 28, in step 206, retrieves generic keywords in the generic keyword set 50b, and in step 208, inserts the generic keywords into the generic categories 62 section of the landing page. Furthermore, the optimizer engine 28, in step 210, retrieves at least a portion of related keywords in the related keyword set 50b. In step 212, the optimizer engine 28 inserts the related keywords into the related links section 66 of the landing page.

If, on the other hand, an optimized keyword set exists for the domain name and the number of keywords contained in the set is above the floor threshold but below a ceiling threshold, as is determined in steps 204 and 214, the optimizer engine determines that the domain is a semi-optimized domain. Accordingly, in step 216, the optimizer engine 28 retrieves at least a portion of the optimized keyword set 52a for the domain name. In step 218, the optimized keywords are inserted into the popular links section 112 of the landing page. In addition, the optimizer engine 28 retrieves at least a portion of the related keywords in the related keyword set 52b and inserts the related keywords in the related links section 66 of the landing page.

If, however, the number of keywords contained in the optimized keyword set is above the ceiling threshold number, the domain is a fully optimized domain. In this case, the optimizer engine 28, in step 220, retrieves at least a portion of the optimized keywords in the optimized keyword set 54a, and inserts the optimized keywords into the popular links section 112 of the landing page in step 222.

Figure 8:
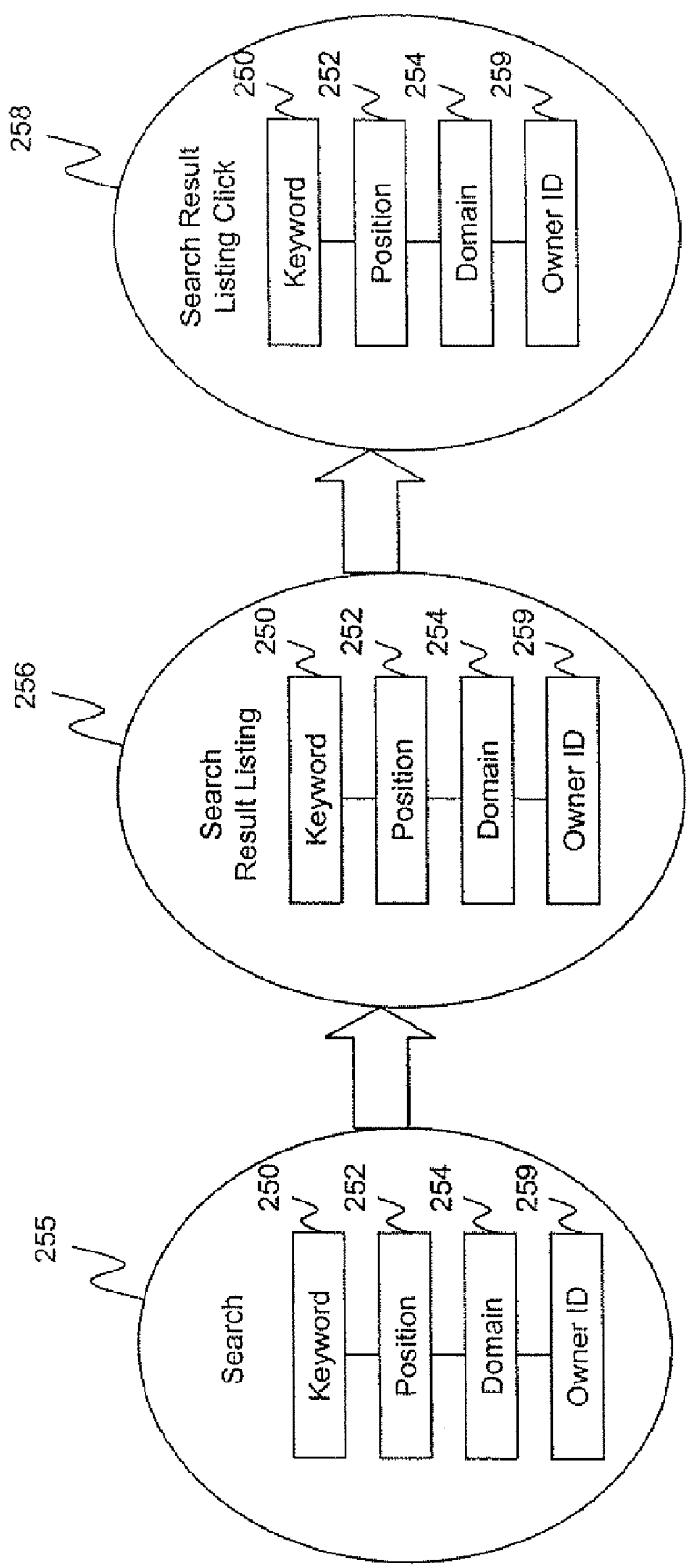
FIG. 8 is a functional block diagram illustrating the tracking of a user's interaction with respect to a particular keyword according to one embodiment of the invention.

FIG. 8 is a functional block diagram illustrating the tracking of a user's interaction with respect to a particular keyword according to one embodiment of the invention. When an initial landing page is first displayed, the user may interact with the landing page by conducting a search 255 for a keyword or keyword phrase 250 for which the user desires additional information. This may be accomplished, for example, by typing-in the keyword 250 into the search field 70, 106, 124 or selecting a particular keyword link 64, 68, 102. The keyword 250 is stored in a search action table allocated to the domain along with a position information 252, a domain name 254, and an owner identifier 259. The position information 252 indicates where in the landing page the keyword was entered or selected. For example, the position information may indicate that the keyword was entered on a type-in search field 70, 106, 124, or selected from a popular links section 112, related links section 66, or generic category 62 section. The keyword may be deemed to be more or less important for optimization purposes based on the position of the landing page in which the keyword was provided. The domain name 254 is the domain name associated with the landing page. The owner identifier 259 identifier the owner of the domain name for allowing any revenues generated due to user interactions on the domain landing page to be correctly dispersed to the domain name owner.

The entry or selection of the keyword creates a search results page, such as, for example, the search results page 120 of FIG. 6, displaying search result listings 256 for the keyword 250. According to one embodiment of the invention, the search result listings on the search results page inherit the keyword 250, position 252, and domain name information 254 of an initial search request. This allows the selection of a particular search result listing, that is, a search result listing click 258 to be traced back to the original keyword 250, position 252, and domain name 254 information that generated the search result listings. The search result listing click is stored in a click action table allocated to the domain name. Information on whether the keyword resulted on an actual search result listing click may help determine the importance of the keyword for optimization purposes. Furthermore, the search result listing click information may be used for sharing revenues generated from the click with the domain name owner.

Figure 9:
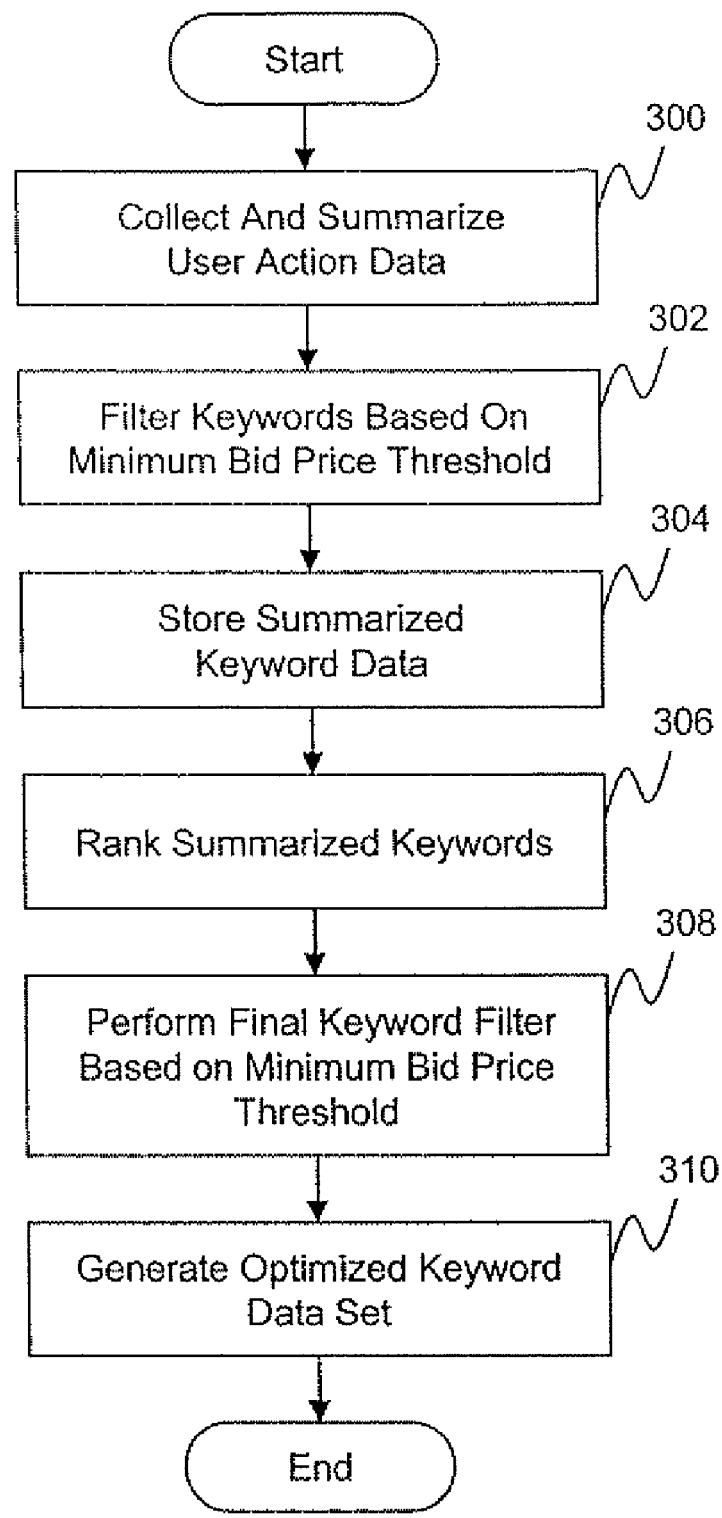
FIG. 9 is a flow diagram of a process implemented by an optimizer engine for generating an optimized keyword set based on tracked user interactions according to one embodiment of the invention.

FIG. 9 is a flow diagram of a process implemented by the optimizer engine 28 for generating an optimized keyword set based on tracked user interactions according to one embodiment of the invention. The illustrated optimization process is performed on a periodic basis, such as, for example, once a day, for all domains that have not yet been fully optimized. If a domain has been fully optimized, the optimization process may not be re-invoked until after a passage of a particular period of time. At this point, it may be desirable to re-optimize a fully-optimized domain to ensure that it captures current interests and trends.

In step 300, the optimizer engine 28 summarizes user action data collected from visitors of the domain for the current day as well any past historic data. For a new domain name, no past historic data exists, and only the new user action data, referred to as seed data, for the domain is summarized.

In order to summarize user action data, the optimizer engine 28 retrieves the search and click actions accumulated for the domain in the search and click action tables. The optimizer engine 28 then classifies the retrieved user actions into various categories. According to one embodiment of the invention, searches conducted by a user are classified into various search categories based on the position on the landing page utilized to transmit the search request. For example, search keywords typed into a search field 70, 106, 124, is classified as a type-in search. Selection of a related keyword link 68 is classified as a related search. Selection of an optimized keyword link 102 is classified as a popular search, and selection of a generic keyword link 64 is classified as a generic search. In the event that a search request is supplied from a popup or pop-under page, the search is respectively classified as a popup or pop-under search.

Clicks of search result listings displayed on the search results page 120 are classified into various click categories based on the category of the keyword search generating the search result listing. For example, a click of a search result listing generated as a result of a type-in search is classified as a type-in click. A click of a search result listing generated as a result of a popular search is classified as a popular click. A click of a search result listing displayed as a result of generic search is classified as a generic click. Furthermore, a click of an ad link displayed on the direct links section 104 of the landing page is classified as a direct link click. A click of other ad links displayed in a pop-up or pop-under page are respectively classified as a pop-up or pop-under clicks.

In step 302, the optimizer engine 28 filters out keywords associated with the clicks and searches which advertiser bid prices are below a minimum bid-price. If the bid price for a keyword is below a minimum bid price threshold, the keyword is excluded from the optimized keyword set for the domain name. In this regard, the mass storage device 18 maintains in the local keyword bid database the keywords and bid amounts maintained in the bid databases 20, 22. The optimizer engine 28 invokes a search and retrieval routine on the local keyword bid database and determines each advertiser's bid price for each collected keyword. If the bid price is less than the minimum bid price threshold, the keyword is excluded from the optimized keyword set. In one embodiment, for efficiency purposes, the local keyword bid database instead of the remote bid databases 20, 22 is searched for making this determination. The keyword bid database is, updated periodically to reflect any updates in the bid databases 20, 22.

In step 304, the summarized keyword data for keywords that remain after the filtering step 302 is stored in a summary table generated for the domain name and maintained in the mass storage device.

In step 306, the optimizer engine ranks the summarized keywords for the domain name according to their keyword points. The higher the keyword points, the more relevant the keywords are assumed to be for a user of the domain. A keyword point is assigned based on search and click information accumulated for the keyword. According to one embodiment of the invention, a keyword point is calculated according to the following formula:

$$\text{Keyword Point} = W_1 * \text{SearchFreq}_1 + \ldots + W_n * \text{SearchFreq}_N + X_1 * \text{ClickFreq}_1 + \ldots + X_n * \text{ClickFreq}_N$$

where each SearchFreq represents the number of searches for a particular search category collected over a period of time, such as, for example, thirty days, and W represents a weight associated with the particular search category; and each ClickFreq represents the number of clicks for a particular click category collected over the same period of time, and X represents a weight associated with the particular click category.

According to one embodiment of the invention, the search and click data is weighed differently based on their classifications. For example, type-in searches and clicks are given the highest weight, or priority, in determining the keyword point, followed by popular searches and clicks. At the bottom of the weighing system are generic searches and clicks for generic keywords positioned at statistically low-traffic positions on the landing page.

In step 308, a final keyword filter is run for filtering out the ranked keywords that do not meet the minimum bid price threshold. The difference between the keyword filter in step 302 and the filter in step 308 is that the filter in step 302 occurs based on information stored in the keyword bid database. In contrast, the filter in step 308 occurs in near real time based on bid data stored in the bid databases 20, 22. This ensures that the most updated bid information is used for deciding whether a keyword should be included into the optimized keyword data set, further ensuring that the optimized keyword data set remains sensitive to market fluctuations.

In step 310, the keywords remaining after the final filter step are set, in step 310, as the optimized keyword set for the domain. According to one embodiment of the invention, the optimized keyword set includes in addition to the optimized keywords, their associated keyword points. The keywords in the optimized keyword set may then be organized according to the keyword points. According to one embodiment of the invention, each keyword in the optimized keyword set is associated with a list of ad links provided by the various advertisers bidding for the particular keyword. The keywords and ad links are then used to generate the content of the landing page as well as any popup and pop-under pages associated with the domain name.

As will be appreciated by a person of skill in the art, the domain optimization process relies on user actions with the domain, whether it be typing-in a keyword or clicking on one of more keyword links or ad links. However, not all visitors of the domain will perform an action, especially if the domain landing page contains irrelevant or generic keyword terms. Thus, according to one embodiment of the invention, the optimizer engine 28 engages in semantic analysis of an analysis keyword, which may be the domain name itself, and/or, to the extent that any keyword has been entered or selected by a user on the domain landing page, the user-entered or selected keyword. The result of the semantic analysis is the generation of the related keyword set 50a, 52b for including in the non-optimized and semi-optimized domains 50, 52.

According to one embodiment of the invention, semantic analysis attempts to obtain for the analysis keyword, a set of related keywords that are aimed to be of interest to the user. In dong so, an assumption is made that if an advertiser bids on a set of keywords, those keywords must be related in some way. Thus, for example, if an advertiser bids on the keyword "flower" as well as on "floral," "flower delivery," "plant," and "florist," an assumption is made that these words are related to each other.

According to one embodiment of the invention, the landing server 16 maintains in the mass storage device 18, a related keyword database with a list of related keywords for each keyword in the local keyword bid database. The related keyword database may be automatically generated and updated on a periodic basis by identifying all the advertisers bidding on a particular keyword and retrieving the other keywords that have also been bid by the identified advertisers. The retrieved keywords and/or the canonicalized versions of the retrieved keywords, are then set as the keywords related to the particular keyword. According to one embodiment of the invention, a canonicalized keyword is a simplest version of the keyword. For example, the canonicalized version of the keyword "flowers" is "flower." Furthermore, the canonicalized version of the keyword "playstation" is the words "play" and "station." In this instance, both the words "play" and "station" are included into the related keyword database.

Figure 10:
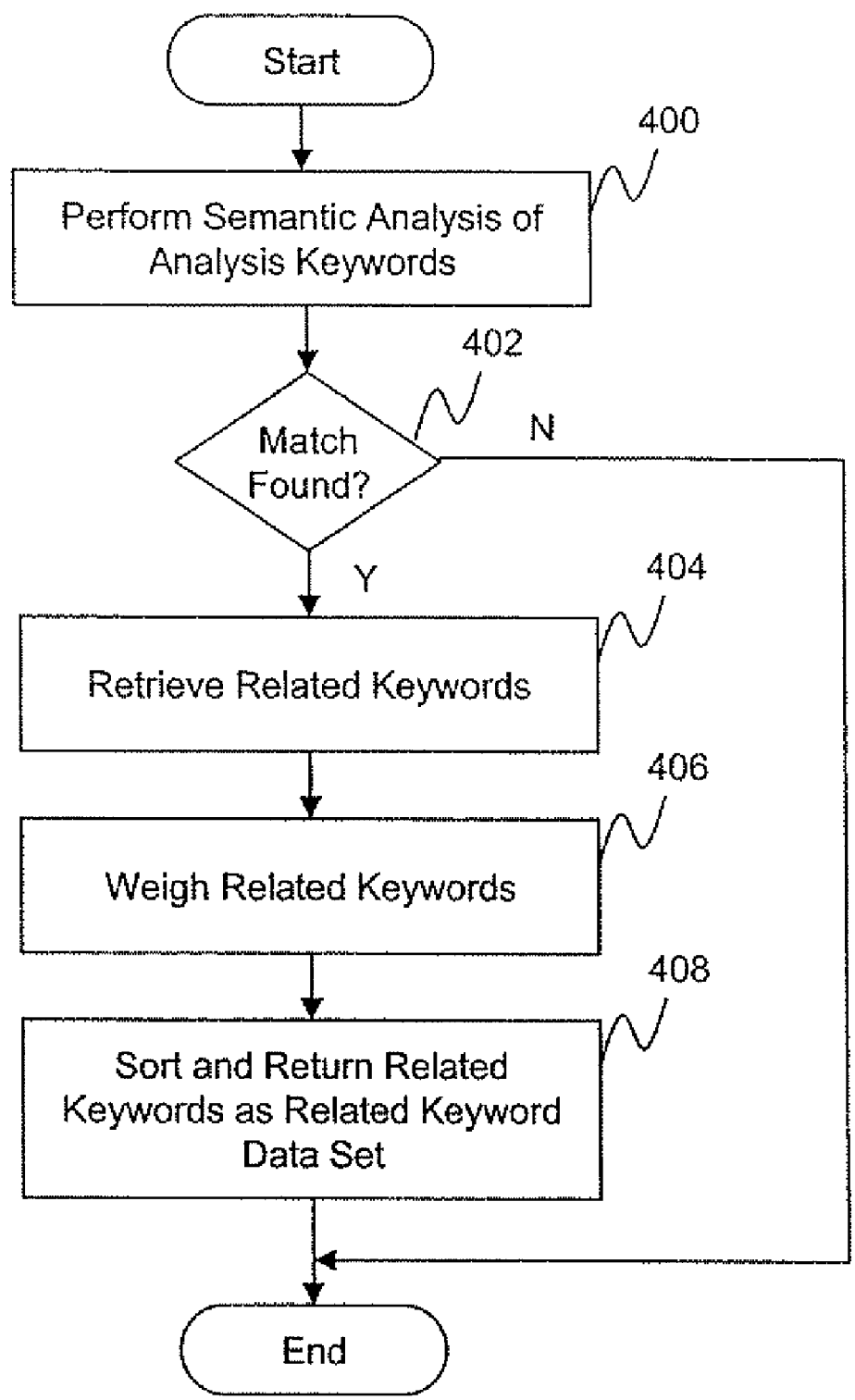
FIG. 10 is a process flow diagram implemented by an optimizer engine for generating a related keyword set according to one embodiment of the invention.

FIG. 10 is a process flow diagram for generating a related keyword set based on semantic analysis according to one embodiment of the invention. In step 400, the optimizer engine 28 receives an analysis keyword and invokes a semantic analysis module for performing a semantic analysis of the keyword. The analysis keyword may be all or part of the domain name entered by a user which is redirected to the landing server 16 by the domain server 14, and/or a search keyword or keyword phrase typed-in or selected by a user. According to one embodiment of the invention, semantic analysis includes performing typographical corrections of the analysis keyword according to conventional mechanisms.

In step 402, a determination is made as to whether a match of the analysis keyword may be made from the keywords in the local keyword bid database. The match may be a match of the entire analysis keyword or simply a portion of the keyword.

If the semantic analysis engine successfully makes a match of all or a portion of the analysis keyword in the local keyword bid database, the engine proceeds to retrieve, in step 404, the related keywords from the related keyword database. In step 406, the related keywords are weighed based on the advertiser bid prices for the keywords, a total number of keywords bid by an advertiser, and the like. For example, if the bidding price for one related keyword is higher than the bidding price for another related keyword, the higher bid keyword is deemed to be more relevant than the lower bid keyword, and thus given a higher weight than the lower bid keyword. Furthermore, the more keywords for which an make a advertiser bid, the less relevant each individual keyword is assumed to be. For example, in the above "flower" example, if a first advertiser bids on three keywords "flowers," "floral," and "gifts," and a second advertiser bids on the keyword "flower" as well as other two-hundred keywords including the keyword "mortgage," the keywords bid by the first advertiser are given a higher weight than the keywords bid by the second advertiser when considering them as keywords that are related to the word "flower."

The optimizer engine may further filter certain types of related keywords before generating a final related keyword set. For example, the optimizer engine may automatically filter the retrieved related keywords to exclude offensive words, duplicates, and the like.

In step 408, the optimizer engine 28 sorts and returns a result set with a predetermined number of related keywords. For example, the optimizer engine 28 may return the first twenty related keywords with the highest weights for including in the related keyword set 50a, 52b.

According to one embodiment of the invention, the optimizer engine 28 maintains for each domain name owner, a list of domain names owned by the owner that have been registered with the landing server 16. The registration may occur, for example, by accessing a web page provided by the landing server 16 and providing to the server user registration information including the list of domain names owned by the user. The optimizer engine 28 maintains revenue and use statistics information for each domain name, and provides such information to the domain name owner on a periodic basis. The use and revenue data may be compiled and correlated, for example, into domain statistics reports that are delivered to the domain name owner via e-mail or other delivery mechanisms. The domain name owner may also access a graphics user interface provided by the landing server over the Internet and access the reports as desired. The domain statistics reports may be used, for example, by the domain-name owner to assess a domain's performance, value, and popularity.

Figure 11:
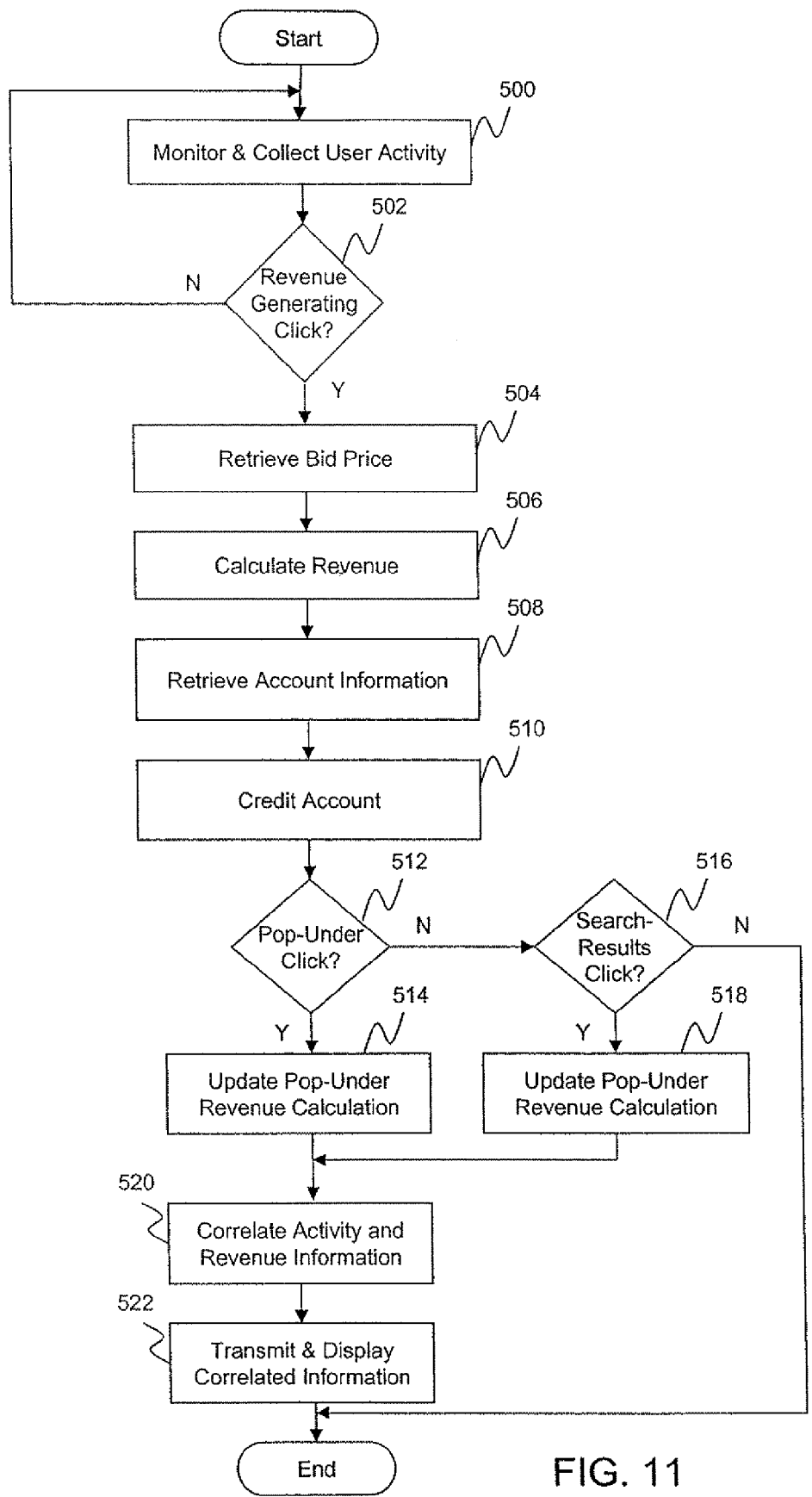
FIG. 11 is a flow diagram of a process executed by an optimizer engine for updating revenue and use information for a particular domain name according to one embodiment of the invention.

FIG. 11 is a flow diagram of a process executed by the optimizer engine 28 for updating revenue and use information for a particular domain name according to one embodiment of the invention. The optimizer engine 28, in step 500, monitors and collects user activity for the domain name in various tables. For example, the optimizer engine 28 may maintain on a daily basis, a running number of visitors to the domain. The optimizer engine may further maintain in one or more search and click action tables, a running number of searches and click actions.

In step 502, a determination is made as to whether a detected user activity is a revenue generating click, such as, for example, a click to an ad link 122 displayed on the search results page 120 or on the direct links section 104 of the landing page (collectively referred to as a search result click), or a click of an ad link displayed on a pop-up or pop-under page (collectively referred to as pop-under click). If the answer is YES, the optimizer engine 28 retrieves from either the local keyword bid database or retailer bid databases 20, 22, in step 504, a bid price for the keyword that generated the click. In step 506, the optimizer engine 28 calculates a current revenue that is to be shared with the domain name owner. The revenue shared with the domain name owner may be, for example, a portion of the bid price offered for the associated keyword. According to one embodiment of the invention, the optimizer engine 28 may maintain a running total of the revenue generated for the domain name owner.

In step 508, the optimizer engine 28 retrieves the domain name owner's account information, and in step 510, credits the account based on the calculated total revenue. The account information may include, for example, credit card information, bank account information, or the like, and the crediting may include transferring a fund for the calculated amount to the account.

According to one embodiment of the invention, the optimizer engine 28 may further determine what portion of the total revenue is accountable to what kind of user action. For example, the optimizer engine 28 may determine an amount of revenue generated due to pop-under clicks as opposed to an amount of revenue generated due to search result clicks. In this regard, the optimizer engine determines in step 512 if the click was a pop-under click. If the click was a pop-under click, the engine updates, in step 514, a pop-under revenue calculation maintained for the domain name.

In step 516, the optimizer engine determines if the click was a search result click. If the click was a search result click, the engine updates a search revenue calculation in step 518.

According to one embodiment of the invention, an assessment of the source of the revenues may be used by the optimizer engine 28 to take automatic actions for further optimizing the domain with an aim of higher revenues for the domain name owner. Such actions may relate to the selection and placement of keywords, search result listings, and/or ads. For example, if a certain percentage of the total revenues are accountable to pop-under clicks, the optimizer engine 28 may automatically increase the number of pop-under ads.

In step 520, the engine correlates the monitored activity 30 and revenue information into various fields of a domain statistics report that is automatically generated for the domain name owner on a periodic basis. In step 522, the report is transmitted to the domain name owner over the Internet 12 and displayed on a display device.

Figure 12:
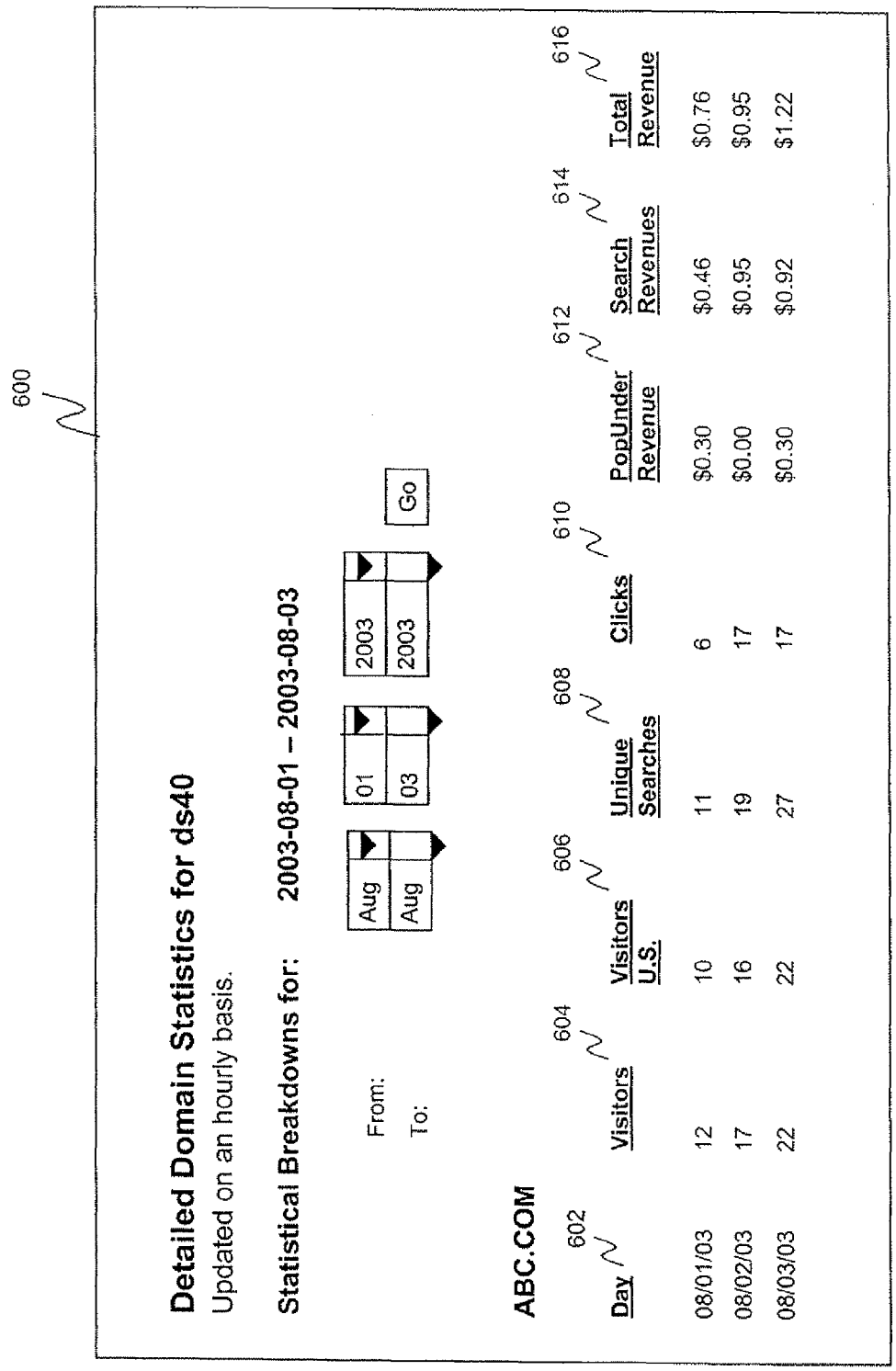
FIG. 12 is an exemplary screenshot of a domain statistics report for a particular domain name according to one embodiment of the invention.

FIG. 12 is an exemplary screenshot of a domain statistics report 600 for a particular domain name according to one embodiment of the invention. The report provides to the domain name owner a detailed, granular statistics on visitors to the domain and revenues generated from the domain traffic.

According to the illustrated screenshot, the report includes for a particular day 602, a total number of visitors 604 who have accessed the domain name as well as a total number of U.S. visitors 606 who have accessed the domain name from the U.S. The report further includes a unique searches field 608 and clicks field 610 respectively indicating the number of searches and search result clicks. A pop-under revenue field 612 indicates the daily earnings generated from a pop-under page. A search revenue field 614 indicates the daily earning generated from a keyword search. A total revenue field 616 displays a total revenue generated for the domain name on a particular day.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computerized method for optimizing a domain name page, the method comprising:

receiving a first group of at least one request for a domain name page originating from a first group of at least one device responding to a first group of at least one user;

displaying content on the requested domain name page to each of the first group of users, the domain name page including a plurality of keywords and at least one interactive region, each interactive region including a page position identifier and being associated with at least a position weight;

tracking user interactions of each of the first group of users with the displayed domain name page, the tracking including identifying one or more of the interactive regions in which the user interactions occur for each of the keywords, and determining a frequency of the user interactions in the corresponding interactive region for each of the keywords;

for each of the first group of users, storing the tracked information for at least one particular interaction including the associated position identifier identifying the interactive region on the domain name page in which each of the stored user interactions occurred;

receiving at least one request for the domain name page from a second group of at least one user device; and, displaying an updated domain name page on each of the second group of at least one user device, the updated domain name page being updated based on the tracked user interactions, the updating including computing a keyword point for each of the keywords as a function of the frequency of the user interactions for the corresponding keyword for each of the at least one of the interactive regions, and the weight assigned to the corresponding interactive region.

2. The method of claim 1, wherein the updated keyword set is an optimized keyword set including keywords selected based on advertiser bid price.

3. The method of claim 2, wherein the displaying of the updated domain name page includes displaying the keywords in the optimized keyword set as part of the updated content.

4. The method of claim 3, wherein the displaying of the updated domain name page includes displaying default keywords included in a generic keyword set and related keywords in a related keyword set, wherein the related keywords are selected based on semantic analysis of a domain name used for retrieving the domain name page.

5. The method of claim 1, wherein the particular keyword and associated position identifier are stored in association with a domain name used for retrieving the domain name page.

6. The method of claim 1, wherein the frequency of the user interactions is a search frequency indicative of a number of searches conducted based on the particular keyword at the interactive region identified by the position identifier, and the tracking of the user interactions include, for each of the first group of users: storing the search frequency in association with the particular keyword and the associated position identifier.

7. The method of claim 6, wherein the frequency of the user interactions is a click frequency indicative of a number of selections of search result listings, and the tracking of the user interactions include, for each of the first group of users, displaying a search results page including at least one of the search result listings based on the particular keyword, wherein the search result listings inherit the particular keyword and the associated position identifier; determining the click frequency on the displayed search results page; and, storing the click frequency in association with the particular keyword and the associated position identifier.

8. The method of claim 1 further comprising: ranking the keywords in the keyword set based on the computed keyword point.

9. The method of claim 1, wherein the weight for a particular interactive region is determined based on traffic statistics for the interactive region.

10. The method of claim 9, wherein the interactive region with a higher traffic statistics is given a higher weight than the interactive region with the lower traffic statistics.

11. The method of claim 1, wherein the domain name page displayed on each of the first group of user devices contains the same initial content.

12. The method of claim 1, wherein the updated domain name page displayed on each of the second group of user devices contains the same initial updated content.

13. A computerized system for optimizing a served domain name page, the system comprising:
a processor, said processor being arranged to serve a domain name page in response to a request from a first group of at least one user device controlled by a first group of at least one user, the domain name page including a dynamic set of one or more keywords, and at least one interactive region, each interactive region being identified by a position identifier and being associated with a weight;
an optimizing engine, said optimizing engine including at least one data processing device, said optimizing engine being arranged to track a plurality of interactions of each of the first group of users with the domain name page, wherein the tracked interactions include identifying one or more of the interactive regions in which each user interaction occurs for each of the keywords and data sufficient to determine a frequency associated with the user interactions in the corresponding interactive region for each of the keywords; said optimizing engine being arranged to be capable of modifying the set of keywords to be assigned to the domain name page based on the tracked user interactions, said optimizing engine being capable of computing a keyword point for each of the keywords as a function of the frequency of the user interactions for the corresponding keyword for each of the one or more of the interactive regions and the weight assigned to the corresponding interactive region, and capable of updating the content including a modified set of keywords to be served by the processor in response to a request from a second group of at least one user to serve the domain name page; and,
interactive addressable memory, said interactive addressable memory being capable of storing data concerning the tracked interactions for each of the first group of at least one user, the particular keyword identified by each the user for a particular one of the user interactions and the associated position identifier identifying the interactive region on the domain name page in which the particular one of the user interactions occurred, said interactive addressable memory being in communication with the optimizing engine.

14. The system of claim 13, wherein the modified keyword set is an optimized keyword set including keywords selected based on advertiser bid price.

15. The system of claim 14, wherein the modified keyword set is displayed as part of the content of the domain name page served to the second group of at least one user.

16. The system of claim 15, wherein the content of the domain name page served to the second group of at least one user displays default keywords included in a generic keyword set and related keywords in a related keyword set, wherein the related keywords are selected based on semantic analysis of a domain name used for retrieving the domain name page.

17. The system of claim 13, wherein the interactive addressable memory stores the particular keyword and associated position identifier in association with a domain name used for retrieving the domain name page.

18. The system of claim 13, wherein the frequency of the user interactions is a search frequency indicative of a number of searches conducted based on the particular keyword at the interactive region identified by the position identifier, and the optimizing engine communicates to the interactive addressable memory the search frequency in association with the particular keyword and the associated position identifier for each of the first group of at least one user.

19. The system of claim 18, wherein the frequency of the user interactions is a click frequency indicative of a number of selections of search result listings, and the processor displays a search results page to at least one of the first and second user groups including a plurality of search result listings based on the particular keyword, wherein the search result listings inherit the particular keyword and the associated position identifier;
said optimizing engine is capable of determining the click frequency on the displayed search results page;
and the interactive addressable memory stores the click frequency in association with the particular keyword and the associated position identifier.

20. The system of claim 13 further comprising: an optimizing engine capable of ranking the keywords in the modified keyword set based on the computed keyword point.

21. The system of claim 13, wherein the weight for a particular interactive region is determined based on traffic statistics for the interactive region.

22. The system of claim 21, wherein the interactive region with a higher traffic statistics is given a higher weight than the interactive region with the lower traffic statistics.

23. The system of claim 13, wherein the domain name page displayed to the first group of users has the appearance of containing the same initial content.

24. The system of claim 13, wherein the domain name page displayed to the second group of users has the appearance of containing the same updated content.

25. The system of claim 13 wherein the processor includes at least a first server and a second server.

26. The system of claim 13 wherein the first group of users includes at least one user who is not part of the second group of users.

27. The system of claim 13 wherein the second group of users includes at least one user who is not part of the first group of users.

28. The system of claim 13 wherein the optimizing engine includes at least a first set of software instructions acting on a first data processing device and a second set of software instructions acting on a second data processing device.

* * * * *